(12) United States Patent
Seguineau et al.

(10) Patent No.: US 6,839,159 B2
(45) Date of Patent: Jan. 4, 2005

(54) DEMULTIPLEXER FOR OPTICAL TIME-DIVISION MULTIPLEXED SIGNALS

(75) Inventors: Frederic Seguineau, Bures Sur-Yvette (FR); Olivier Leclerc, Sainte Geneviéve des Bois (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 10/603,739

(22) Filed: Jun. 26, 2003

(65) Prior Publication Data

US 2004/0109229 A1 Jun. 10, 2004

(30) Foreign Application Priority Data

Jul. 11, 2002 (EP) .............................. 02360205

(51) Int. Cl.⁷ .............................. H01S 3/00; H04J 14/08
(52) U.S. Cl. ...................................... 359/334; 398/101
(58) Field of Search ............................ 359/334; 398/98, 398/101

(56) References Cited

U.S. PATENT DOCUMENTS

| | | | |
|---|---|---|---|
| 5,880,866 A | * | 3/1999 | Stolen ........................ 398/101 |
| 6,377,389 B1 | | 4/2002 | Grubb et al. |
| 2002/0048070 A1 | | 4/2002 | Gabitov |

FOREIGN PATENT DOCUMENTS

| | | |
|---|---|---|
| EP | 0 843 435 A2 | 5/1998 |
| EP | 1 381 178 A1 * | 1/2004 |
| JP | 355076919 A * | 6/1980 |
| WO | WO 99/55038 A1 | 10/1999 |

OTHER PUBLICATIONS

J. Nillson et al: "Continuous wave pumped holey fiber Raman laser" USC 2002, pp. 315–317, XP001118610.
Dianov E M etal: "Raman Fibre–Optic Amplifier of Signals at the Wavelength of 1.3UM" Quantum Electronics, American Institute of Physics, Woodbury, NY, US, vol. 24, No. 9, Sep. 1, 1994, pp. 749–751, XP000479855.

* cited by examiner

*Primary Examiner*—Mark Hellner
(74) *Attorney, Agent, or Firm*—Sughrue Mion, PLLC

(57) ABSTRACT

A demultiplexer for an optical time-division multiplexed digital signal, which has a signal wavelength $\lambda_s$ and is transmitted with a bit rate B, is described. It comprises a Raman active optical medium, a pump source for generating a periodic optical pump signal having a pump wavelength $\lambda_p$ and a periodicity of B/n where n is an integer $\geq 2$, and a coupler for coupling the digital signal and the pump signal into the Raman active optical medium. The new demultiplexer exploits the non-linear Raman gain response of the Raman active medium to a high power pump signal and has a narrow time window and a high extinction ratio.

5 Claims, 4 Drawing Sheets

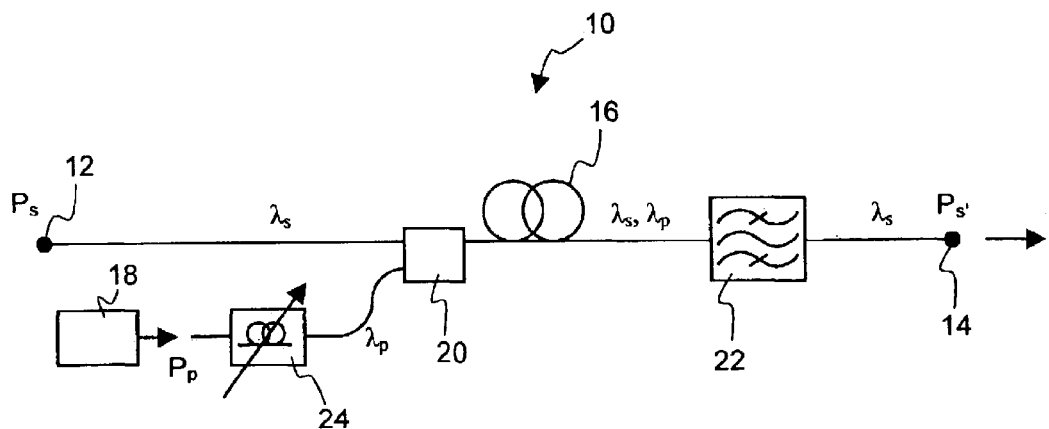
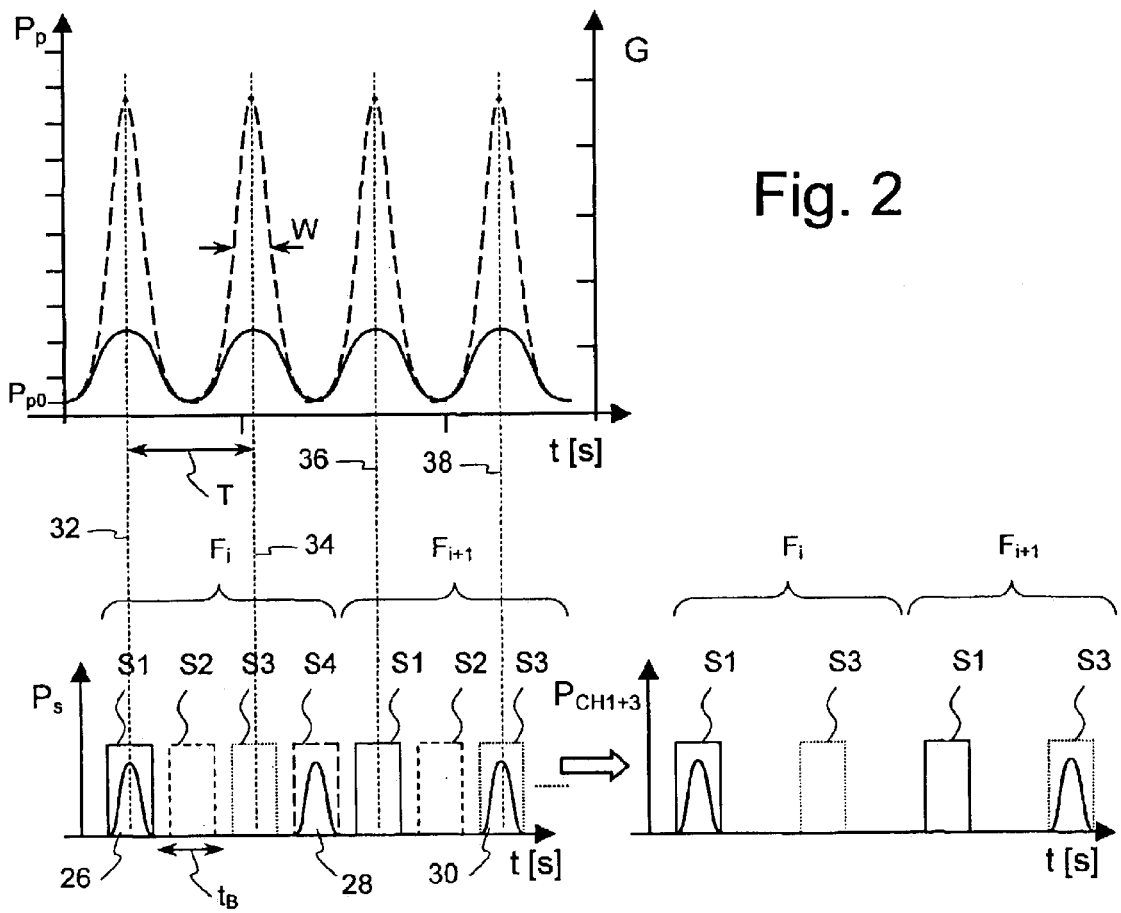
Fig. 1
Fig. 2
Fig. 3a          Fig. 3b

DEMULTIPLEXER FOR OPTICAL TIME-DIVISION MULTIPLEXED SIGNALS

The invention is based on a priority application EP 02 360 205.5 which is hereby incorporated by reference.

BACKGROUND OF THE INVENTION

The present invention relates to a demultiplexer for an optical time-division multiplexed (OTDM) digital signal that has a signal wavelength $\lambda_s$ and is transmitted with a bit rate B. The invention further relates to a method for demultiplexing such a digital signal.

In a typical OTDM system, an optical pulse source on the transmitter side generates a pulse train with a channel bit rate $B_C$ that equals the base rate of electronic data streams fed to the OTDM system. At present, the highest electronic base rate available is 40 Gbit/s. The optical pulse train generated by the pulse source is coupled into n optical branches in which modulators are driven by the electrical data streams. Each modulator imprints the incoming data stream on the pulse train, thereby generating an optical data signal with the channel bit rate $B_C$. The n optical data signals, which represent n different channels, are interleaved by a delay-line multiplexer on a bit-by-bit basis (bit interleaving TDM) or on a packet-by-packet basis (packet interleaving TDM). The multiplexer generates a multiplexed optical data signal with a multiplex bit rate $B_M = n \times B_C$. The multiplexed signal is then launched into a transmission medium, for example a single-mode optical fiber.

On a receiver side, an optical demultiplexer usually de-interleaves the channels, because electronic devices are not capable of directly processing signals with bit rates $B_M$. The demultiplexed signals with the channel bit rate $B_C$ are finally reconverted by optoelectronic devices into electric signals for further processing.

In ultra-high-speed OTDM transmission systems having bit rates of more than 40 Gbit/s, pulse durations are extremely short. For a 160-Gbit/s system, for example, the time slot for a single bit is only 6.25 ps wide. In systems using return to zero (RZ) pulses, i.e. pulses that return to zero power level within each time slot, the width of a pulse is even shorter, namely about one half of the time slot width.

Such extremely short pulse durations pose very high demands on demultiplexers that are one of the key components in OTDM transmission systems. Demultiplexers are not only required for the transmission systems as such but also for bit error rate (BER) measurement equipment that is used for the design and testing of transmission systems. Demultiplexers that are capable of separating pulses in ultra-high bit rate optical transmission systems require very short time windows, a high extinction ratio and a weak polarization dependence.

Until now there are several approaches for realizing such ultra-high bit rate demultiplexers.

One approach is to use an electro-absorption modulator that is capable of producing a short time window with a high extinction ratio when isolating a desired channel from an incoming pulse train. Electro-absorption modulators are semiconductor devices that have an absorber region whose properties can be changed by the switching of an electric field applied across the absorber region. The electric field can be changed fast enough to make switching rates of up to 40 GHz possible.

These devices, however, have intrinsically a high insertion loss, typically of more than 10 dB. This loss has to be compensated by amplifiers that add ASE (amplified spontaneous emission) noise to the signal. Furthermore, due to the intrinsic transfer function of the modulator, there is always a trade-off between a high extinction ratio on the one hand and a short time window on the other hand. Finally, electro-absorption modulators that are used for demultiplexing ultra-high bit rate data signals require numerous costly components that are difficult to manufacture, to package and to optimize.

Another approach for realizing ultra-high bit rate demultiplexers is to use a non-linear optical loop mirror (NOLM) that may be considered as a fiber version of a Sagnac interferometer. A two-by-two directional coupler divides a data pulse train into two pulse trains that counter-propagate around a common loop of fiber. Clock-pulsed intensity variations induce phase modulations within the non-linear optical regime of the fiber as a result of the Kerr effect. These phase modulations alter the phase relationship of the paired counter-propagating pulses. Upon return to the directional coupler, the combined pulses are switched between the input and output of the coupler in accordance with their interference properties. Constructively interfering pulses are reflected back through the coupler's input, whereas destructively interfering pulses are transmitted through the coupler's output.

NOLMs are practically not limited in speed but suffer from an intrinsic instability due to the long span of fibers used in the fiber loop. Moreover, it is difficult to achieve a polarization independence of the device. Finally, demultiplexing by NOLMs require ultra-short optical clock pulses that induce the Kerr effect in the loop.

SUMMARY OF THE INVENTION

It is, therefore, an object of the present invention to provide a demultiplexer for an OTDM digital signal as mentioned at the outset that is stable in operation and has a low insertion loss and a narrow time window.

According to the invention, this object is achieved, with the demultiplexer as mentioned at the outset, in that the demultiplexer comprises a Raman active optical medium, a pump source for generating a periodic optical pump signal having a pump wavelength $\lambda_p$ and a periodicity of B/n where n is an integer $\geq 2$, and a coupler for coupling the digital signal and the pump signal into the Raman active optical medium.

The new demultiplexer exploits the fact that a Raman active optical medium displays a non-linear Raman gain response that depends exponentially from the power of the pump signal. The Raman gain (or absorption) function obtained with high pump powers can thus be very different from its initial form at low pump powers. By carefully selecting the properties of the Raman active optical medium, particularly with respect to the size of the effective area and the dopant concentration, and by adjusting the pump power of the pump source, it is possible to match the temporal width of the gain/absorption window of the medium to the temporal width of the time slots of the multiplexed signal. The new demultiplexer thus allows to demultiplex even a 160 Gbit/s OTDM signal directly to a 10 Gbit/s signal.

The Raman optical medium may be made of any material that displays a strong non-linear Raman response to high optical intensities, for example a highly non-linear dispersion shifted fiber (HNL-DSF) having a high Raman efficiency.

No particular constraints are imposed to the waveform of the pump signal. However, a sinusoidal or Gaussian shape is preferred because these waveforms can be easily achieved with conventional pump sources such as semiconductor lasers.

If the signal wavelength $\lambda_s$ is chosen to be larger than the pump wavelength $\lambda_p$, the demultiplexed signal will be amplified, because in this case energy is transferred from the pump signal to the digital signal. This allows to achieve an extinction ratio of a demultiplexed signal of more than 30 dB.

In this context it is particularly preferred if the difference between the signal wavelength $\lambda_s$ and the pump wavelength $\lambda_p$ is chosen such that the Raman gain of the optical medium is at its maximum. With such a choice it is ensured that the demultiplexed signal has a maximum extinction ratio.

If, however, the signal wavelength $\lambda_s$ is chosen to be smaller than the pump wavelength $\lambda_p$, the demultiplexed signal is attenuated. A particular channel may then be separated from the demultiplexed signal by (successively) eliminating those time slots that are assigned to the remaining channels.

A preferred embodiment of the new demultiplexer comprises tunable delay means for tuning the phase relationship between the pump signal and the digital signal. The provision of such tunable delay means allows to select a desired channel from an incoming OTDM signal by delaying the pump signal in such a way that the maximum gain (or absorption) phase-matches the time slots of the desired channel.

In this context it is particularly preferred if the delay means is arranged between the pump source and the coupler. This is advantageous because the delay means do not have to be wavelength sensitive as would be the case if arranged between the coupler and the Raman active optical medium.

According to another advantageous embodiment the new demultiplexer comprises an optical filter which has a stop band containing a pump wavelength $\lambda_p$ which is arranged, in the propagation direction of the signals, behind the Raman active optical medium. Such an optical filter effectively prevents the pump signal from being output by the demultiplexer.

It is to be understood that the features mentioned above and those yet to be explained below can be used not only in the respective combinations indicated, but also in other combinations or in isolation, without leaving the scope of the present invention.

BRIEF DESCRIPTION OF THE DRAWINGS

The above and other advantages and features of the present invention will become apparent from the following description of the preferred embodiments given in conjunction with the accompanying drawings, in which:

FIG. 1 shows a schematic diagram of a first embodiment of a demultiplexer according to the present invention;

FIG. 2 is a graph showing the pump power of the pump source shown in FIG. 1, and the temporal Raman gain achieved in the Raman active medium of the embodiment shown in FIG. 1;

FIG. 3a shows an illustration of a multiplexed pulse train;

FIG. 3b shows an illustration of a demultiplexed pulse train;

FIG. 8a is a schematic representation of a multiplexed pulse train as in FIG. 3a;

FIG. 8b is a schematic representation of a multiplexed pulse train as in FIG. 3b, but for the second embodiment;

FIG. 1 schematically depicts a first exemplary embodiment of a demultiplexer according to the present invention, being designated in its entirety by 10. Demultiplexer 10 comprises an optical input 12 in which an optical time-division multiplexed (OTDM) digital signal $P_s$ having a signal wavelength $\lambda_s$ and a bit rate B can be coupled into. Demultiplexer 10 further comprises an optical output 14 at which a demultiplexed optical signal $P_{s'}$ of wavelength $\lambda_s$ may be coupled into another optical component.

Figure 4:
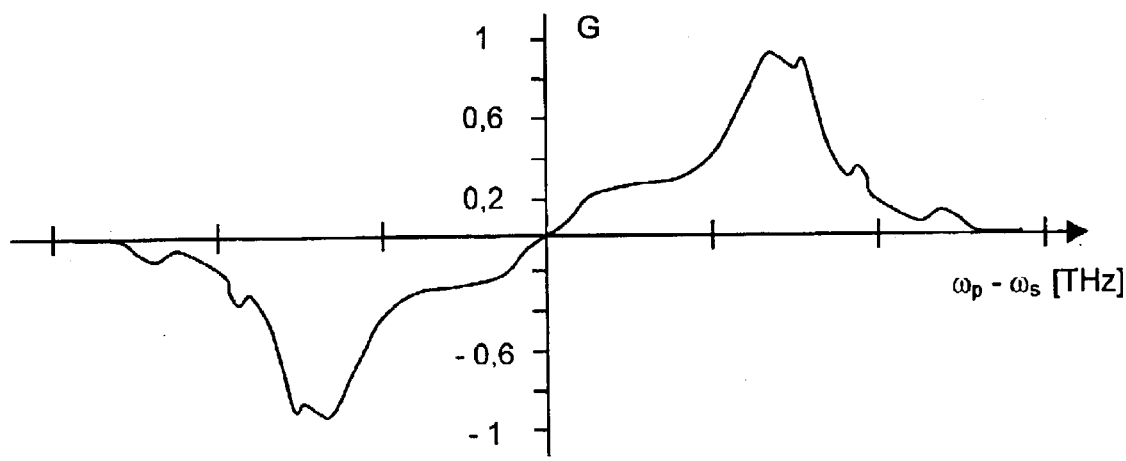
FIG. 4 shows a gain function of the Raman active optical medium.

Between input 12 and output 14 a Raman active optical medium is disposed, which in this embodiment is a Raman active fiber 16 of the kind as used in Raman fiber amplifiers. The underlying physical principle of Raman amplification is the effect of stimulated Raman scattering. This is a non-linear optical process that occurs at high optical intensities and involves coupling of light propagating through the non-linear medium to vibrational modes of the medium. Amplification is caused by an energy transfer from pump radiation to signal radiation.

Raman active fiber 16 is preferably a highly non-linear dispersion shifted fiber (HNL-DSF) having a high Raman efficiency, i.e. a small effective area and/or an efficient doping in order to reduce the required length of optical fiber 16 and also the pump power. Particularly suitable are novel holey fibers as are known from a paper by J. Nilsson et al. entitled "Continuous-Wave Pumped holey Fiber Raman Laser", USC 2002, page 315–317. Such holey fibers allow to tune the chromatic dispersion so that the pump signal and the digital signal travel with a similar velocity. Also calcogenic fibers and even standard dispersion shifted fibers can be used as Raman active fiber 16.

Demultiplexer 10 further comprises a pump source 18 for generating a periodic optical pump signal $P_p$ having a pump wavelength $\lambda_p$ and a periodicity of B/n where n is an integer $\geq 2$. Pump source 18 may be, for example, a neodymium or ytterbium fiber laser, a Raman laser or any other single mode laser. A coupler 20 is disposed between input 12 and pump source 18 on the one hand and Raman active fiber 16 on the other hand so as to couple the digital signal $P_s$ launched into input 12 and the pump signal $P_p$ generated by pump source 18 into Raman active fiber 16.

An optical filter 22 is arranged between Raman active fiber 16 and output 14. Optical filter 22 has a stop band that contains the pump wavelength $\lambda_p$ so that radiation of wavelength $\lambda_p$ is eliminated from the demultiplexed signal $P_{s'}$. Optical filter 22 is only optional; it may be dispensed with, for example, if the pump signal $P_p$ generated by pump source 18 does not disturb the further transmission and/or processing of the demultiplexed signal, or if the pump signal $P_p$ is almost completely eliminated by Raman scattering in Raman active fiber 16.

Demultiplexer 10 further comprises, in the embodiment shown, a tunable optical delay 24 that is arranged between pump source 18 and coupler 20. Tunable optical delay 24 is provided for tuning the phase relationship between the pump signal $P_p$ and the digital signal $P_s$ before both signals are combined in Raman active fiber 16 by coupler 20. Such a tunable delay 24 can be realized by k−1 fixed delays with delay values $T/2, T/4, \ldots, T/2^{k-1}$ that are interconnected by k 2×2 optical switches, as is known in the art as such.

Since tunable optical delay 24 is provided for tuning the phase relationship between the pump signal $P_p$ and the digital signal $P_s$, it may alternatively be arranged between input 12 and coupler 20. Of course, a non-tunable optical delay can also be used, or the delay may be completely dispensed with. In the latter case, it has to be ensured that some sort of synchronization can be maintained between pump source 18 and a source for the digital signal.

In the following the function of demultiplexer 10 will be explained in more detail with reference to FIGS. 2 to 5.

FIG. 2 shows, in solid lines, the pump signal $P_p$ plotted against time t. In the embodiment shown in FIG. 1 the periodic optical pump signal $P_p$ generated by pump source 18 is chosen to be sinusoidal with a periodicity T such that $$P_p(t) = P_{p0} \cdot (1 + m \cdot \sin\omega_p t) \quad (1)$$
$$= P_{p0} \cdot (1 + m \cdot \sin(\omega_p(t+T)))$$

with $P_{p0}$ and m being constants that are characteristic for the pump power and the pump modulation of pump source 18, and $\omega_p$ being the frequency of the pump signal $P_p$.

Frequency $\omega_p$ is chosen so that $$\omega_p = 2\pi B/n, \ n \geq 2 \quad (2)$$

where B is the bit rate of the multiplexed digital signal $P_s$ and n is the demultiplexing factor, here chosen as 2. Since the pump source requires only a clock signal having a (relatively) low frequency $\omega_p = 2\pi B/n$, pump source 18 may be a conventional semiconductor laser.

If the pump power $P_p$ that is launched into Raman active fiber 16 via coupler 20 is sufficiently high, Raman active fiber 16 displays a non-linear Raman gain response. After having travelled a length z in Raman active fiber 16, digital signal power will then be given by the following equation:

$$P_s(z, t) = P_s(0)\exp(-\alpha z) \cdot \exp(C_R L_{eff} P_p(t)) \quad (3)$$

where α is the absorption factor, $C_R$ is the Raman efficiency coefficient and $L_{eff}$ is the effective length of fiber 16.

Due to the exponential dependency of the Raman gain response, Raman gain function G(t) is a strongly fluctuating periodic function which is shown in FIG. 2 in broken lines. This effective gain function has periodic gain windows having a very small half width that is designated in FIG. 2 by W. From this it becomes clear that a multiplexed optical signal that is exposed to such a Raman gain modulated by pump source 18 will be subject to strong modifications that depend on the phase relationship between the pulses in the digital signal on the one hand and the gain windows in Raman active fiber 16 on the other hand.

This aspect is shown in FIGS. 3a and 3b in the form of a schematic representation of a multiplexed signal as fed into input 12 (FIG. 3a) and after having been demultiplexed within Raman active fiber 16 (FIG. 3b). The digital signal $P_s$ may conceptionally be divided into subsequent frames $F_i$, $F_{i+1}$, . . . that each comprise 4 time slots indicated by numerals S1, S2, S3, S4 for each frame $F_i$. The first time slot S1 is assigned to a channel CH1, the second time slot S2 is assigned to a channel CH2 and so on. For the sake of clarity, the time slots S1, S2, S3 and S4 are illustrated as rectangles that are slightly spaced apart so that the time slots are distinguishable by their different graphic representation. The actual width of each time slot is indicated in FIG. 3a by $t_B$ where $t_B$ is the reciprocal of the bit rate B. In the example shown in FIG. 3a, time slots S1 and S4 in frame $F_i$ and time slot S3 in the subsequent frame $F_{i+1}$ carry a "1" bit so that pulses 26, 28 and 30, respectively, are shown in these time slots.

If now one of the gain windows of the Raman gain function G(t) coincides with one of the time slots, a pulse within this time slot will be amplified, whereas other pulses that do not coincide with a gain window will be absorbed by Raman active fiber 16.

In FIGS. 2 and 3a such coincidences between gain windows of the gain function G(t) and time slots are indicated by dash-dotted lines 32, 34, 36 and 38. Consequently, time slots S1 and S3 of all frames are isolated as is shown in FIG. 3b. Thus channels 1 and 3 that are associated with time slots S1 and S3 are isolated in one process from the four channels that had been present in the multiplexed digital signal $P_s$.

As becomes clear from equation (3), the Raman gain response is very sensitive to variations of Raman gain associated parameters of active fiber 16 and to the pump power $P_p$ of pump source 18. Thus it is possible to adjust the temporal width W of the gain window by a simple adjustment of the pump power, particularly by the choice of $P_{p0}$ and the modulation depth m.

For selecting a particular channel within the demultiplexed signal, tunable optical delay 24 is set in such a way that the gain windows of the Raman gain function coincide with the time slots corresponding to the selected channel.

FIG. 4 shows a normalized Raman gain spectrum in which Raman gain G is plotted against the difference between pump frequency $\omega_p$ and digital signal frequency $\omega_s$. As can be seen from FIG. 4, a net Raman gain can be achieved when the pump frequency $\omega_p$ is greater than the digital signal frequency $\omega_s$.

Figure 5:
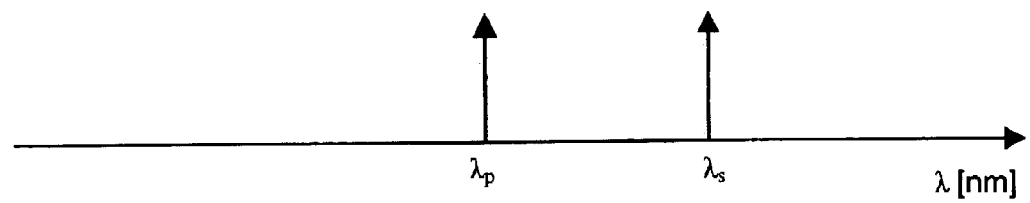
FIG. 5 is a schematic diagram showing the relation between the pump wavelength and the signal wavelength for the first embodiment in which the Raman net gain is exploited for demultiplexing a digital signal.

This condition is shown for the wavelength domain in the schematic representation of FIG. 5. Under this condition energy is transferred from the pump signal to the digital signal so that demultiplexing is achieved by selectively amplifying pulses in the digital signal.

Figure 6:
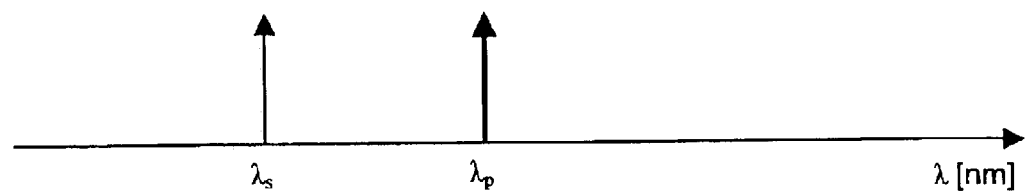
FIG. 6 shows a similar representation as in FIG. 5, but for a second embodiment in which the Raman net absorption is exploited for demultiplexing a digital signal.

If, however, the pump frequency $\omega_p$ is smaller than the digital signal frequency $\omega_s$, as schematically shown in the wavelength domain in FIG. 6, the Raman active fiber is absorbing in the sense that energy is transferred from the digital signal to the pump signal. This means that time slots coinciding with the absorption window of the gain function will be eliminated from the signal.

Figure 7:
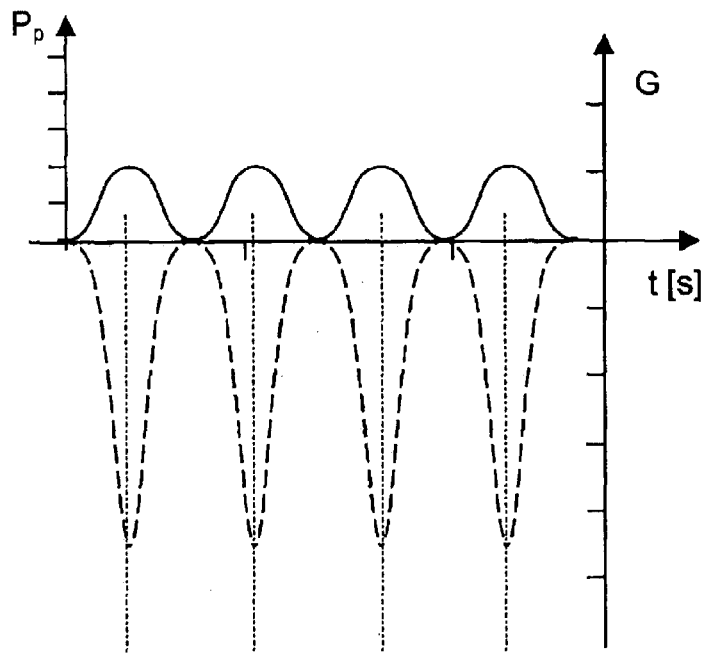
FIG. 7 is a graph, like FIG. 2, but for the second embodiment.
Figures 8A, 8B:
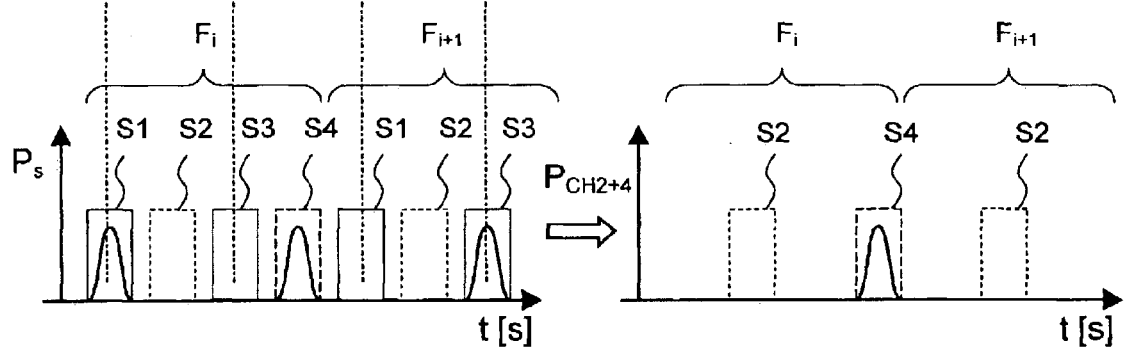

This situation is shown in FIGS. 7, 8a and 8b that correspond to FIGS. 2, 3a and 3b, respectively. FIG. 7 shows that the gain function G(t) is negative if Raman active fiber 16 is pumped by a pump signal $P_p$ having a longer wavelength than the digital signal $P_s$. Time slots S1 and S3 of frame $F_i$ and frame $F_{i+1}$ coincide with absorption windows of the gain function so that they are eliminated when transmitted through Raman active fiber 16. As is shown in FIG. 8b, only time slots S2 and S4 in each frame arrive at optical output 14 of demultiplexer 10.

In the embodiments explained with reference to FIGS. 2 to 8 it has been assumed that the digital signal comprises four channels CH1, CH2, CH3 and CH4 and that the demultiplexing factor n equals 2. This means that, when using only one demultiplexer 10, two channels can be isolated from the digital signal. For isolating for example channel CH1 from the demultiplexed signal $P_{Ch1+3}$ as shown in FIG. 3b, another demultiplexer 10 could be connected in series, with a frequency $\omega_{p'}$ of the pump source being twice as large as the pump source frequency $\omega_p$ of the first demultiplexer.

Figure 9:
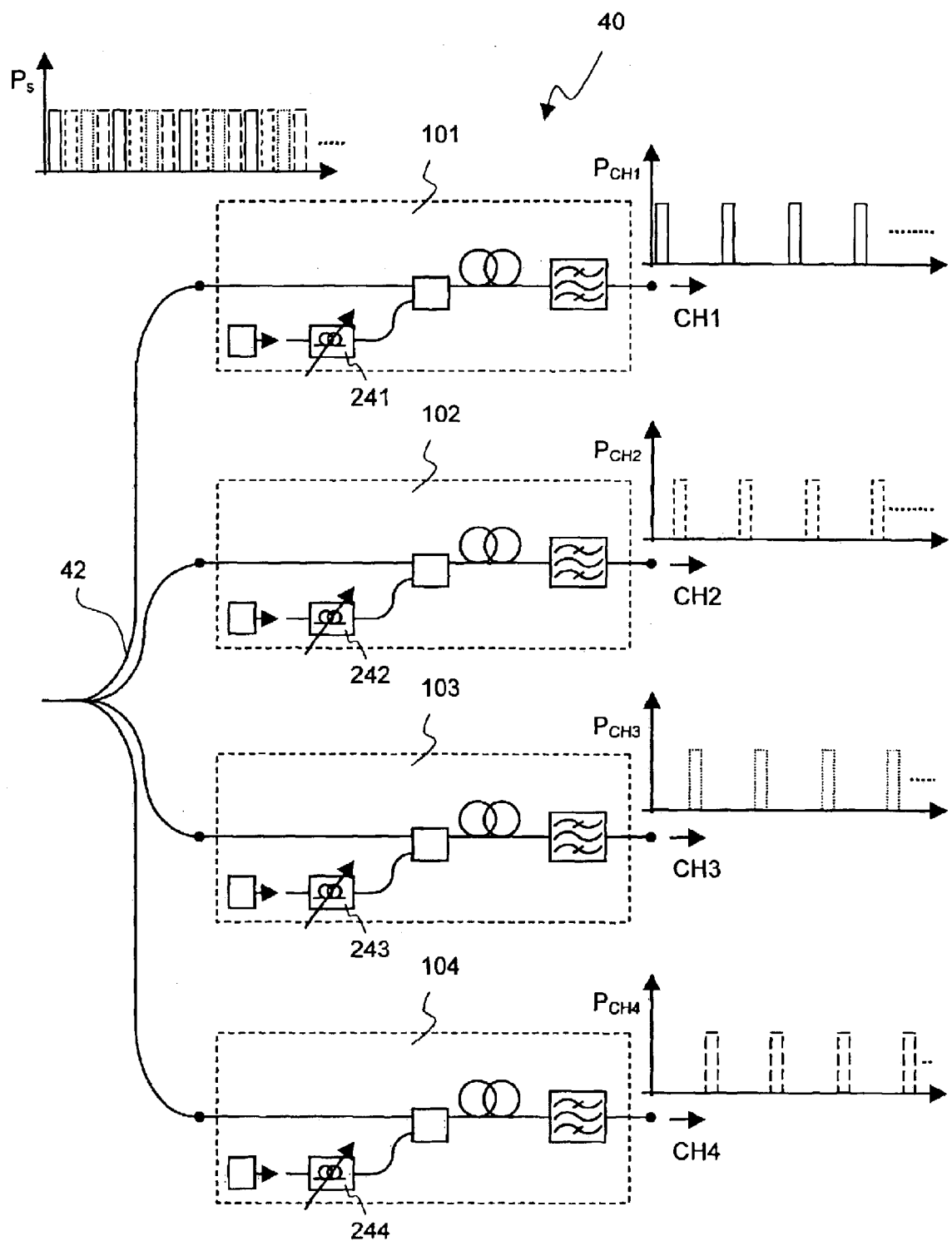
FIG. 9 is a schematic diagram showing a demultiplexing unit comprising four demultiplexers as shown in FIG. 1.

If all four channels CH1, CH2, CH3 and CH4 shall be separated by demultiplexing, a demultiplexing unit as shown in FIG. 9 and designated in its entirety by 40 can be used. Demultiplexing device 40 comprises a splitter 42 that branches an incoming signal $P_s$ into four subsignals that are, apart from a lower power level, identical to the digital signal $P_s$. Each branch of the splitter 42 is connected to a demultiplexer 101, 102, 103 and 104, respectively. The four demultiplexers 101, 102, 103 and 104 are identical to demultiplexer 10 in FIG. 1 but differ with respect to the delay induced by tunable optical delays 241, 242, 243 and 244. The delay times of adjacent demultiplexers differ by an amount $\Delta t=1/B$ or, in other words, by the duration $t_B$ of a time slot. In addition, the demultiplexing factor n is 4 so that according to Equ. (2) the pump frequency of each pump source is $\omega_p=\pi B$.

If the delay time of optical delay 241 is determined such that the gain windows of the gain function G(t) coincide with the time slots S1 assigned to channel CH1, this channel will be isolated and, due to the Raman gain, amplified by demultiplexer 101. Since the gain function of demultiplexer 102 is shifted by one bit period, demultiplexer 102 isolates the time slots of channel CH2. The same applies for the subsequent demultiplexers 103 and 104, correspondingly.

What is claimed is:

1. A demultiplexer for an optical time-division multiplexed digital signal that has a signal wavelength $\lambda_s$ and is transmitted with a bit rate B, comprising:

a Raman active optical medium, a pump source for generating a periodic optical pump signal having a pump wavelength $\lambda_p$ and a periodicity of B/n where n is an integer $\geq 2$, and a coupler for coupling the digital signal and the pump signal into the Raman active optical medium which displays a non-linear Raman gain function depending exponentially on the power of the pump signal, wherein the digital signal wavelength $\lambda_s$ is smaller than the pump wavelength $\lambda_p$ so that the digital signal is attenuated at time slots that coincide with absorption windows of the Raman gain function.

2. The demultiplexer of claim 1, characterized by tunable delay means for tuning the phase relationship between the pump signal and the digital signal.

3. The demultiplexer of claim 2, wherein the delay means is arranged between the pump source and the coupler.

4. The demultiplexer of claim 1, comprising an optical filter which has a stop band containing the pump wavelength $\lambda_p$ and which is arranged, in the propagation direction of the signals, behind the Raman active optical medium.

5. A method for demultiplexing an optical digital signal having a bit rate B, comprising the steps of:

generating a periodic optical pump signal having a periodicity of B/n where n is an integer $\geq 2$, coupling the digital signal and the pump signal into a Raman active optical medium which displays a non-linear Raman gain function depending exponentially on the power of the pump signal, and choosing the pump wave length $\lambda_p$ to be longer than the wavelength $\lambda_s$ of the digital signal, so that the digital signal is attenuated at time slots that coincide with absorption windows of the Raman gain function.

* * * * *